United States Patent [19]
Wenstrom et al.

[11] Patent Number: 4,462,854
[45] Date of Patent: Jul. 31, 1984

[54] PROCESS AND APPARATUS FOR MAKING A MULTI-POCKETED ALBUM PAGE

[75] Inventors: Roger A. Wenstrom; Donald E. Irvin, St. Cloud, both of Minn.; George L. MacKay, Hingham; Hugh A. Robinson, Burlington, both of Mass.

[73] Assignee: William W. Holes, St. Cloud, Minn.

[21] Appl. No.: 534,417

[22] Filed: Sep. 21, 1983

[51] Int. Cl.$^3$ ............................................. B32B 31/08
[52] U.S. Cl. ..................................... 156/250; 40/159; 156/253; 156/267; 156/297; 156/299; 156/303; 156/324; 156/510; 156/513; 156/516; 156/543; 156/549; 156/554; 156/555
[58] Field of Search ............... 156/253, 259, 265, 267, 297, 299, 301, 303, 324, 324.4, 250, 510, 513, 516, 543, 549, 554, 555; 40/154, 156, 159

[56] References Cited

U.S. PATENT DOCUMENTS

| | | | |
|---|---|---|---|
| 3,398,036 | 8/1968 | Viesters | 156/302 |
| 3,869,820 | 3/1975 | Holson | 40/159 |
| 4,263,357 | 4/1981 | Holson | 40/159 |
| 4,431,470 | 2/1984 | Schubert | 40/159 |

Primary Examiner—Caleb Weston
Attorney, Agent, or Firm—Williamson, Bains, Moore & Hansen

[57] ABSTRACT

A process and apparatus for making a multi-pocketed album page includes means for supporting and guiding a plurality of transparent plastic strips into contacting relation with opposite surfaces of a paperboard web, the latter being moved through a predetermined path of travel. Longitudinal heat sealing means are provided for heat sealing the plastic strips to the paperboard web in a direction along the path of travel of the strips and paperboard web. Transverse heat sealing means are also provided for heat sealing the strips to opposite surfaces of the paperboard web transversely of the path of travel. Shiftable cutting or shearing means are provided for cutting the paperboard web and transparent strips, after sealing, into page size so that each page is provided with a plurality of upwardly opening transparent pockets on both surfaces thereof.

7 Claims, 13 Drawing Figures

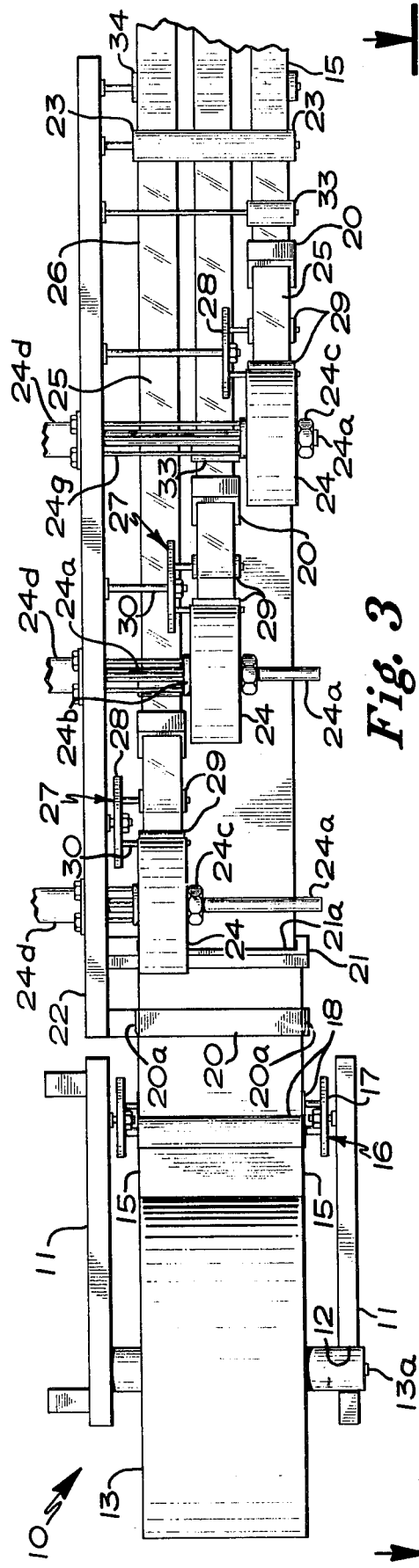
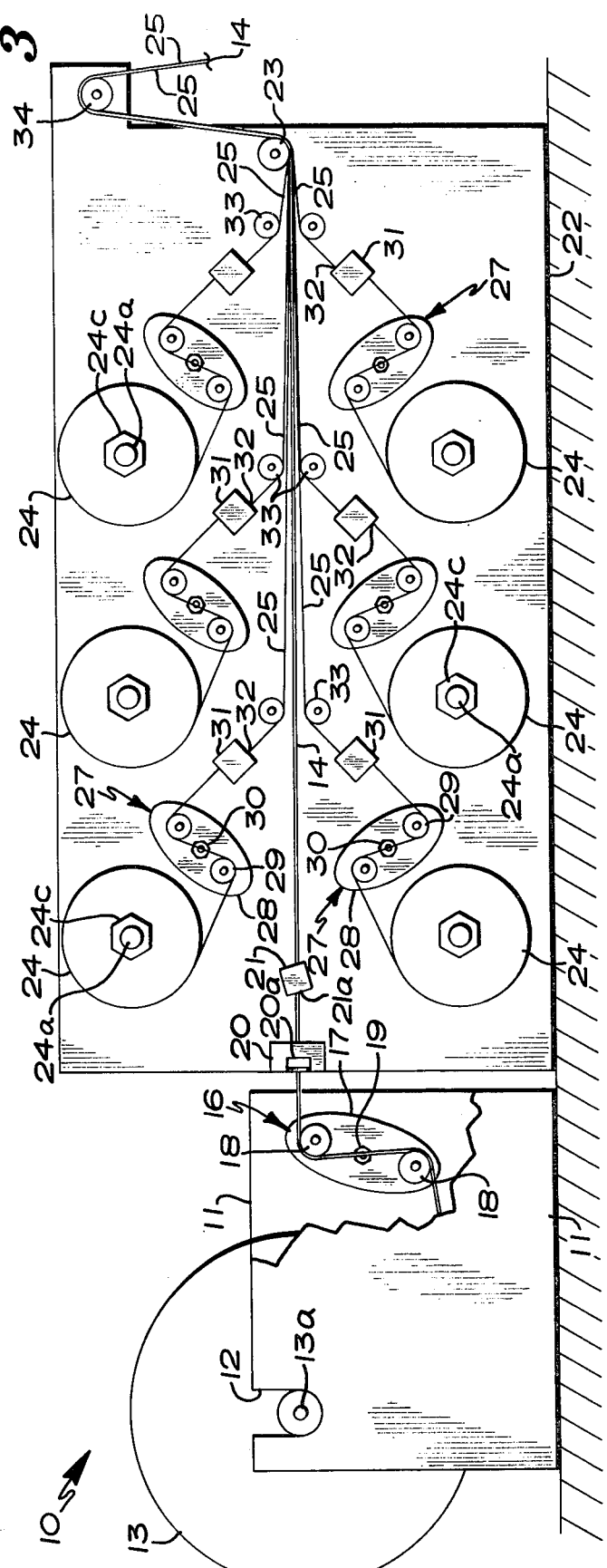

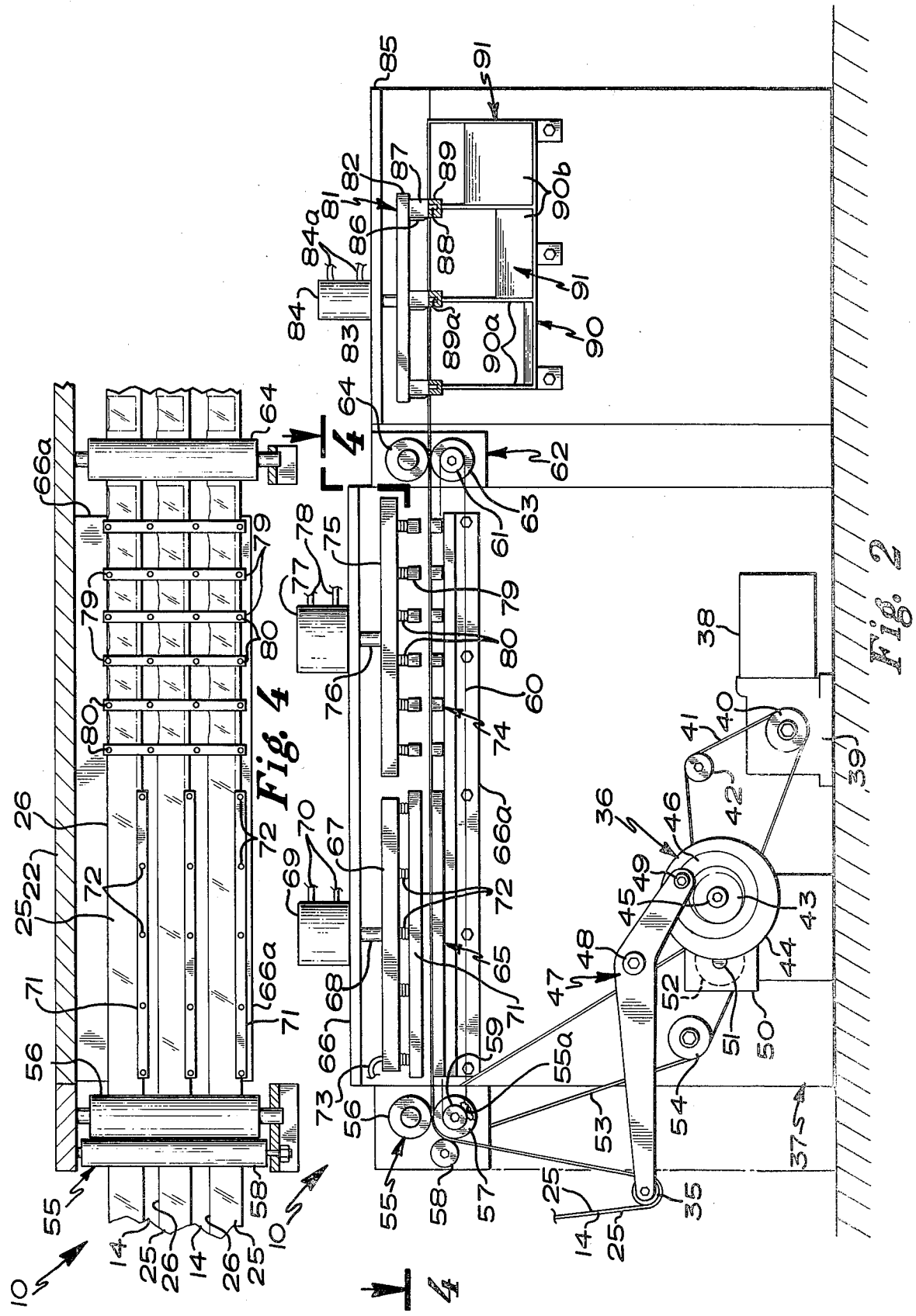

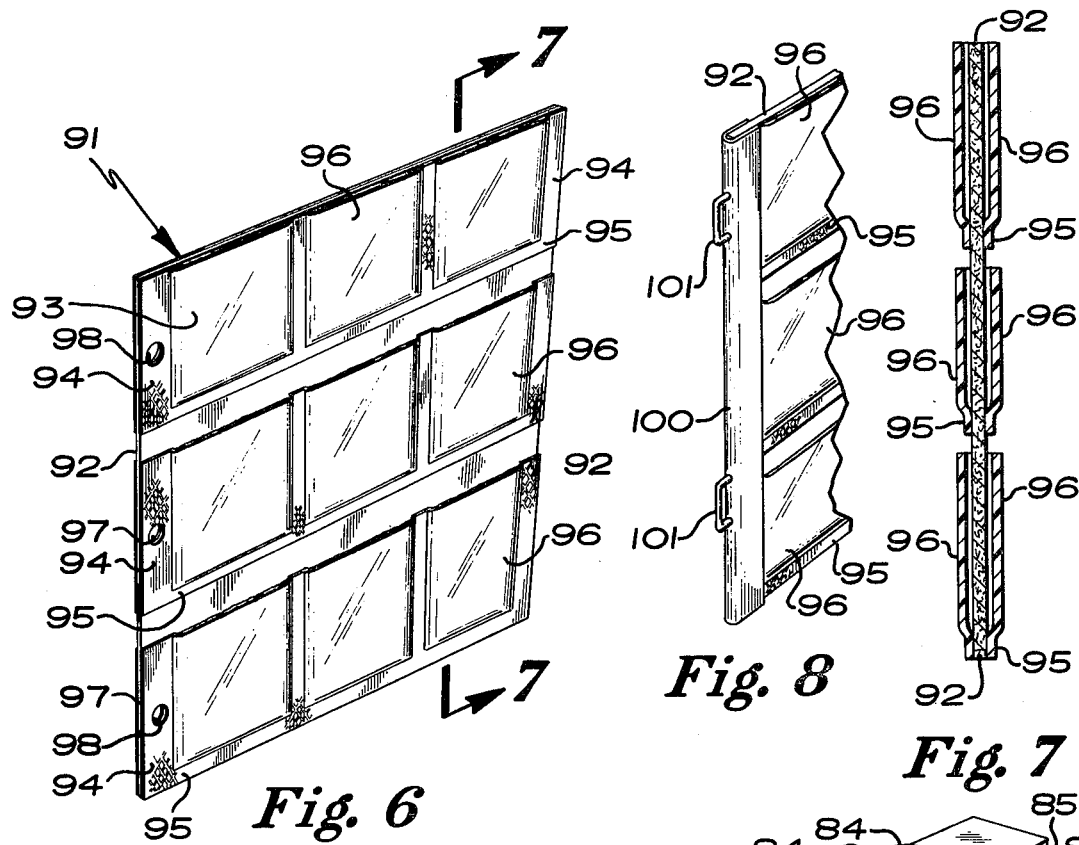
Fig. 6
Fig. 7
Fig. 8
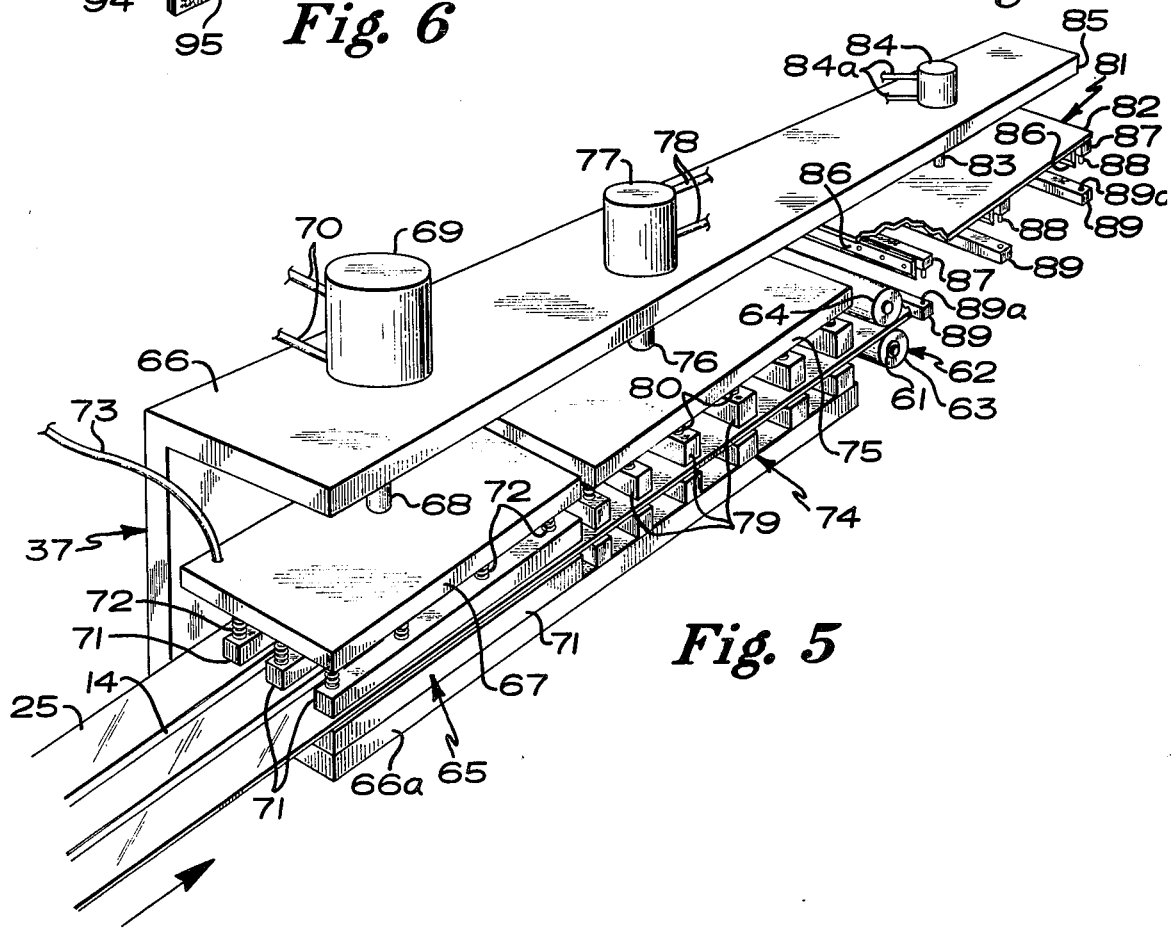
Fig. 5

PROCESS AND APPARATUS FOR MAKING A MULTI-POCKETED ALBUM PAGE

SUMMARY OF THE INVENTION

This invention relates to a process and apparatus for making a multi-pocketed album page for use with photograph albums.

An object of this invention is to provide a process and apparatus for making a multi-pocketed album page wherein one or more photographs may be accommodated in each pocket of the album page.

A more specific object of this invention is to provide a process and apparatus for continuously making pocketed album pages wherein transparent strips of plastic are adhered to opposite surfaces of a panel of paperboard by heat sealing or through the use of an adhesive to form pockets in opposite surfaces of the page, each pocket accommodating a photograph therein.

These and other objects and advantages of the invention will appear more fully from the following description made in conjunction with the accompanying drawings wherein like reference characters refer to the same or similar parts throughout the several views.

FIGURES OF THE DRAWING

FIG. 1 is a side elevational view of one portion of the apparatus employed in making a multi-pocketed album page.

FIG. 2 is a side elevational view of the remaining portion of the apparatus.

FIG. 3 is a top plan view of that portion of the apparatus illustrated in FIG. 1.

FIG. 4 is a cross-sectional view taken along line 4—4 of FIG. 2 and looking in the direction of the arrows.

FIG. 5 is a perspective view of a portion of the apparatus illustrated in FIG. 2.

FIG. 6 is a perspective view of one embodiment of an album page made by the process and with the apparatus.

FIG. 7 is a cross-sectional view taken approximately along line 7—7 of FIG. 6 and looking in the direction of the arrows.

FIG. 8 is a fragmentary perspective view of an album page utilizing U-shaped binding elements for accommodating flexible straps.

DESCRIPTION OF THE PREFERRED EMBODIMENT

Figure 9:
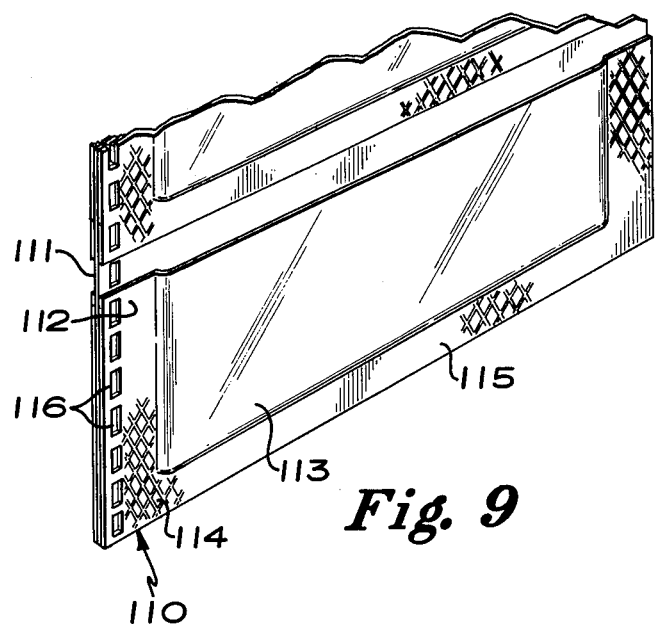
FIG. 9 is a fragmentary perspective view of a different embodiment of an album page provided with openings for accommodating a comb-type binding.

Referring now to the drawings and more specifically to FIGS. 1 and 2, it will be seen that one embodiment of the novel apparatus, designated generally by the reference numeral 10, is thereshown. The apparatus 10 includes a pair of spaced apart, generally parallel vertical support plates 11, each having a recess 12 in the upper edge portion thereof, each recess 12 being disposed in alignment with the other recess. The recesses 12 in the support plates 11 accommodate the shaft or axle 13a for the roll of paperboard 13. The paperboard roll 13 is comprised of a paperboard panel 14 which is wound into a tight roll and which has substantially parallel longitudinal side edges 15. The paperboard panel is of a weight and gauge of that normally used in photograph albums. The paperboard panel is unwound from the roll and is moved through a predetermined path of travel in the process of forming album pages. In its predetermined path of travel, the paperboard panel is unwound from the roll 13 and is first trained about a tension mechanism 16. The tension mechanism 16 includes a mounting plate 17 which has a pair of rollers 18 journaled thereon for rotation relative thereto, the plates 17 being pivotally connected to the vertical support plates 11 by a pivot 19. The mounting plate 17 is urged to pivot in a counterclockwise direction, as viewed in FIG. 1, by a spring (not shown) or an automatic tension control device (as used in this art) during operation of the apparatus 10.

The paperboard panel or web is then directed past a slitter mechanism 20 having suitable blades 20a which cut marginal longitudinal edge portions from the panel or web. After slitting or cutting by the slitter device 20, the paperboard panel has clean edges and also has a precise predetermined transverse dimension. Although not shown in the drawing, the scrap produced by the slitter is removed by a centuri scrap blower system and is dumped into a hopper.

The paperboard panel 14 is then passed through an opening 21a in an edge control member 21 to align the edges of the paperboard material in a predetermined relation. The edge control member 20 is mounted on a vertical support plate 22 which is positioned downstream but adjacent the vertical support plates 11. The paperboard panel 14 is then trained over a guide roller 23 located adjacent the other end of the support plate 22 and the paperboard extends upwardly therefrom.

The support plate 22 also supports a plurality of identical rolls of transparent plastic which are used to form the pockets on the album pages. Suitable transparent plastics which may be used include polyester, polystyrene, PVC, polyvinyl chloride acetate, polypropylene or the like. Each strip of plastic has parallel longitudinal edges 26, as best seen in FIG. 3, and it will also be noted that each strip has a width dimension substantially less than the width dimension of the paperboard panel 14. In this regard, the width dimension of the paperboard panel 14 will be greater than the width of a plurality of the plastic strips arranged in side-by-side relation.

Each roll 24 of plastic is mounted on one of a plurality of longitudinally spaced apart shafts 24a which are mounted on the support plate 22. It will be seen that each shaft 24a projects through the sleeve or hub 24b of the associated plastic roll 24. In the embodiment shown, there are a plurality of shafts and associated rolls 24 of plastic mounted on the support plate 22 located above the paperboard panel 14 and a similar number of shafts and rolls 24 mounted below the paperboard panel. A retainer ring 24c is also mounted on the outer end of each shaft for retaining the associated roll of plastic on its shaft.

Means are provided for positioning each roll 24 of plastic in proper position on its associated shaft. This means for each shaft includes a housing 24d secured to the support plate 22. An inflatable bladder 24e is positioned within the housing 24d and is connected to a source of air under pressure by suitable conduit. A plate 24f is secured to the bladder 24e and engages one end of a plurality of fingers 24g which project through openings in the support plate 22. The outer ends of the fingers 24g engage the hub 22b of the roll of plastic 24 to urge the roll of plastic against the retainer ring 24c when the bladder 24e is inflated.

Each strip of plastic 25 is unwound from the associated roll 24 and is trained about one of a plurality of tension mechanisms 27. It is pointed out that the tension mechanisms 27 are of identical construction and each includes a mounting plate 28 having a pair of rollers 29 mounted thereon for revolving movement relative thereto. Each mounting plate is pivotally mounted on the support plate 22 by a dancer or pivot shaft 30 tied to an automatic tension control device (not shown) so that it is urged in a clockwise direction, as viewed in FIG. 3. It is pointed out that the tension mechanisms 27 are similar in construction and operation to the tension mechanism 16 associated with the paperboard roll 13.

Each plastic strip is trained about the associated tension mechanism 27 and is then passed through the opening 32 of one of a plurality of edge control members 31. It will be noted that each edge control member 31 is mounted on the support plate 22 and projects outwardly therefrom. Each plastic strip is thereafter trained about one of a plurality of guide rollers 33, each of which is mounted on the support plate 22. Finally, each plastic strip 25 is then trained about the guide roller 23 and the plastic strips and paperboard panel are then extended upwardly and trained about a guide roller 34 which is located adjacent the upper portion of the support plate 22 adjacent the downstream end thereof. It will be seen that the guide rollers 33 cooperate with the guide roller 23 to direct each plastic strip into contacting relation with one surface of the paperboard panel 14.

In the embodiment shown, the shafts for one group of rolls of transparent plastic are disposed in substantially the same horizontal plane at an elevation above the paperboard panel 14. The shafts 24a of the other group of rolls of plastic are disposed in the same horizontal plane at an elevation located below the paperboard panel.

It will also be seen that the upper horizontal group of rolls 24 of plastic are arranged in laterally staggered relation so that when the strips are unwound from these rolls the strips will engage the upper surface of the paperboard panel in side-by-side spaced apart relation. The rolls of plastic constituting the lower group are arranged in the same fashion so that the strips engage the lower surface in laterally spaced apart side-by-side relation. It is also pointed out that each strip engaging the upper surface will be disposed in registering relation with respect to a strip engaging the lower surface of the paperboard panel 14. Finally, it is also pointed out that the longitudinal edge of one plastic strip is disposed adjacent the longitudinal edge of the paperboard panel and the longitudinal edge of another strip will be disposed adjacent the other longitudinal edge of the paperboard panel 14.

Referring again to FIGS. 1 and 2, it will be seen that the paperboard panel and plastic strips extend downwardly from the roller 34 and are trained over a roller 35 which comprises an element of an indexer device 36. The various components of an indexing, electronic, pneumatically operated dancer 36 are attached to or positioned adjacent a vertical support plate 37. The dancer 36 includes a DC electric motor 38 provided with a gear reduction mechanism 39 having an output shaft which has a drive sprocket 40 keyed thereto. A chain 41 is trained about the drive sprocket 40 and engages idler sprocket 42 and is trained about a cam drive sprocket 43. The cam drive sprocket 43 and a cam 44 are mounted on a camshaft 45 whereby when the drive sprocket 43 is driven, the cam 44 and the camshaft 45 will also be rotated. The cam 44 is provided with an annular cam track 46.

An elongate angulated cam follower arm 47 is pivotally mounted on the support plate 37 by pivot 48 and one end of the cam follower arm 47 has the roller 35 revolvably mounted thereon. The other end of the cam follower arm 47 is provided with a cam follower roller 49 which is positioned in engaging relation in the cam follower track 46. It wll be seen that as the cam 44 is rotated, the cam follower arm 47 will be pivoted by the interaction of the cam follower roller 49 with cam track 46. Pivoting movement of the cam follower arm produces a generally up and down movement of the roller 35 to maintain the paperboard panel and plastic strip in tensioned relation during the indexing action.

The drive from the cam shaft 45 is transmitted to a transfer drive mechanism 50 positioned adjacent the cam 44 and having an output shaft 51. The output shaft 51 has a sprocket 52 keyed thereto and a chain 53 is trained about the sprocket 52 and about an idler sprocket 54. The chain 53 is also trained about a driven sprocket 55a of an indexing drive mechanism 55. The indexing drive mechanism is mounted on the support plate 37 and includes a driven indexing roller 56 which is disposed above and in contacting relation with a roller 57. A roller 58 is positioned adjacent the roller 57 and the paperboard panel and plastic strips extend upwardly from the roller 35 between the rollers 57, 58 and thereafter between the driven index rollers 56 and the roller 57.

The indexing drive mechanism 55 also has a sprocket 59 secured to the input shaft thereof and a chain 60 is trained about the sprocket 59 and about a sprocket 61 mounted on the support plate 37 adjacent the downstream end thereof. The sprocket 61 provides drive to an overdrive roller unit 62 which is provided with a driven roller 63 and a roller 64 disposed in contacting relation therewith.

The support plate 37 is provided with a generally horizontally oriented upper support plate 66 which is rigidly connected with the upper end portion thereof and a lower horizontal support plate 66a spaced below and substantially parallel to the upper support plate 66. The upper and lower support plates support a longitudinal heat sealing mechanism 65. The longitudinal heat sealing mechanism includes generally rectangular shaped upper and lower platens 67 each of which is connected to one of a pair of piston rods 68. Each piston rod 68 is extensible and retractable relative to a double acting pneumatic cylinder 69, one of which is mounted on the upper support plate 66 and the other of which is mounted on the lower support plate 66a. Each pneumatic cylinder is provided with conduits 70 connected to a source of air under pressure and suitable valving (not shown) whereby extension and retraction of the piston rods causes the platens 67 to move vertically toward and away from each other.

Each platen is provided with a plurality of longitudinally extending laterally spaced apart parallel heat sealing bars 71, each bar being connected to the associated platen by springs 72. Each platen is provided with an electrical conductor 73 connected to a source of electric current. In the embodiment shown, the pneumatic cylinders for the upper and lower platens are simultaneously actuated to simultaneously shift the platens toward and away from each other. It is pointed out that either of the platens may be stationary while the other platen moves vertically towards and away from the stationary platen. It will be seen that when the platens are shifted towards each other, the heat sealing bars 71 will simultaneously engage the heat seal zone on the plastic strips which engage opposite surfaces of the paperboard panel and simultaneously heat seal the strips along longitudinal heat seal zones to opposite surfaces of the paperboard panel.

The apparatus 10 also includes a transverse heat sealing mechanism 74 which is also comprised of a pair of generally rectangular shaped identical platens 75 each being connected to a piston rod 76. It will be seen that each piston rod 76 is movable in a double acting pneumatic cylinder 77, one of which is mounted on the upper support plate 66 and the other of which is mounted on the lower support plate 66a. The double acting cylinders 77 are provided with suitable conduits 78 which are connected to a source of air under pressure.

Each platen is provided with a plurality of elongate longitudinally spaced apart transversely extending heat sealing bars 79, which are interconnected to the associated platen by a plurality of springs 80. The double acting pneumatic cylinders 77 for the transverse heat sealing mechanism 74 are simultaneously operable to shift the platens toward and away from each other. It will be appreciated that when the platens are shifted toward each other, the transverse heat sealing bar 79 will heat seal the plastic strips to both surfaces of the paperboard panel along transverse heat seal zones. It will further be appreciated that when either of these platens are stationary, only the movable platen will be shifted during the heat sealing step.

The apparatus 10 also includes a cutting and punching device 81 which is operable and can be simultaneously timed to the paperboard panel to cut the selected album page size and to punch openings in the marginal portions thereof. The cutting and punching device 81 is diagrammatically shown and includes a generally rectangular shaped platen 82 secured to the lower end of a piston rod 83 which is movable in and out of a double acting pneumatic cylinder 84. The double acting cylinder 84 is provided with conduits 84a which are connected to a source of air under pressure. It will be noted that the double acting pneumatic cylinder 84 is secured to a horizontal support plate 85, as best seen in FIG. 2. It will also be noted that the device 81 is located adjacent but downstream of the overdrive roller unit 62.

The platen 82 of the cutting and punching device 81 is provided with a plurality of elongate, transversely extending, longitudinally spaced apart cutter bars 86. The platen 82 is also provided with a plurality of elongate, transversely extending, longitudinally spaced apart bars 87 each having a plurality of transversely spaced apart pins 88 affixed thereto and projecting downwardly therefrom. A plurality of transversely extending, elongate, longitudinally extending bars 89, each having a plurality of transversely spaced apart openings 89a therein, are mounted on the upper edges of bin separator plates 90a of an upwardly opening bin structure 90. The separator plates 90a define a plurality of bins 90b.

In operation, the platen 82 will be urged downwardly by the cylinder 84 so that the cutter bars 86 cut the web or panel of paperboard into a plurality of sheets of predetermined size. Each cutting bar 86 will shear the paperboard against the leading edge of one of bars 89. During downward movement of the platen 82, the pins 88 will, simultaneously with the cutting, penetrate the paperboard and form openings therein. The pages will fall into the bins 90b.

Referring now to FIGS. 6 and 7, it will be seen that a formed album page 91 is thereshown. The album page is comprised of a paperboard panel 92 having the transparent plastic strips 93 heat sealed to opposite surfaces thereof. The transparent plastic strips 93 cooperate with each surface of the paperboard panel to form the pockets 96. Each pocket is heat sealed to the associated surface of the paperboard by transverse heat sealing zones 94 and by longitudinal heat sealing zones 95, thereby leaving one longitudinal edge 97 unsealed. It will be noted that each successive cut edge actually defines the longitudinal edge of the album page and the openings 98 are punched adjacent one of the longitudinal edges. It will be appreciated that each transverse heat sealing zone has a width dimension so that when the transverse cut is made therethrough, the cut edge portions of each transparent strip will remain heat sealed to the album page.

Referring now to FIG. 8, it will be seen that a slightly modified form of the album page is thereshown and uses a binding strip 100 to secure U-shaped hinge members 101 to one edge of the album page. The U-shaped hinge members serve as a means for binding the album pages together into front and rear covers rather than the openings 98 embodied in the album page of FIGS. 6 and 7.

Figure 10:
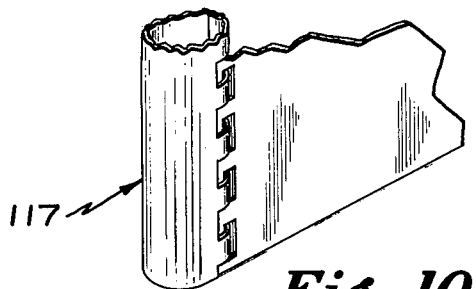
FIG. 10 is a fragmentary perspective view of an album incorporating album pages made by the process and with the apparatus, and employing a comb-type binding.

Referring now to FIGS. 9 and 10, it will be seen that a modified form of the album page is thereshown. Designated generally by the reference numeral 110, it is comprised of a paperboard panel 111 having transparent strips 112 heat sealed to opposite surfaces thereof. These transparent strips define upwardly opening pockets 113 which extend the width of the page. Each pocket is heat sealed to the associated surface of the paperboard by transverse heat sealing zones 114, and a longitudinal heat sealing zone 115. Since the pocket 113 extends the width of the page 110, it will be seen that the transverse heat sealing zones 114 secure only the inner and outer edges of the pocket to the paperboard.

The inner edge of the page has a plurality of generally elongate rectangular shaped openings 116 formed therein rather than the circular openings of FIGS. 6 and 7. The rectangular openings 116 are adapted to accommodate a comb-type binding 117 of well-known construction. It is pointed out that album pages having pockets which extend the full width of the page, such as pocket 113, may also be used on album pages having other types of binding other than the comb-type binding shown in FIGS. 9 and 10.

Figure 11:
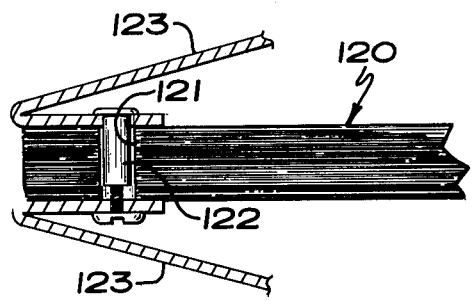
FIG. 11 is a cross-sectional view of a portion of an album incorporating album pages made by the process and with the apparatus and employing a Chicago screw post binding.

Referring now to FIG. 11, it will be seen that a modified form of a binding for the novel album page is thereshown, the album pages being designated generally by the reference numeral 120. These pages 120 have openings 121 in the inner surface thereof for accommodating a Chicago Screw post binder 122 for binding the pages to the album covers 123. In this regard, the album pages will have circular openings such as the openings 97 illustrated in FIGS. 6 and 7.

Figure 12:
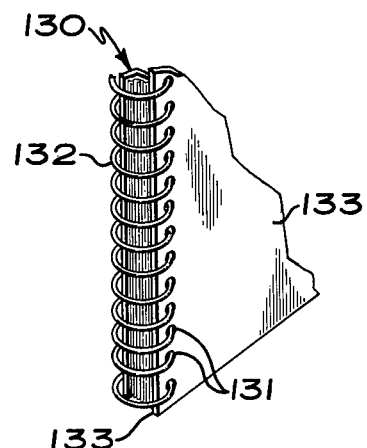
FIG. 12 is a fragmentary perspective view of a portion of an album incorporating album pages made by the process and with the apparatus and employing a special wire binding.
Figure 13:
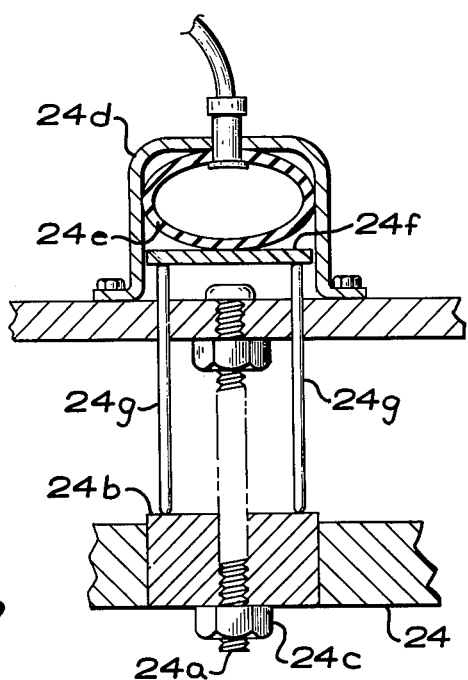
FIG. 13 is a cross-sectional view on an enlarged scale of the means for monitoring plastic rolls on the associated support plate.

Referring now to FIG. 12, it will be seen that a different form of binding for the album pages, designated generally 130, is thereshown, and these album pages are provided with small circular type openings 131 through which a spiral wire type binding 132 extends for securing the pages to the album cover 133. It is again pointed out that the album pages illustrated in FIGS. 11 and 12 may also utilize pockets of the size illustrated in FIGS. 6 and 7, or may use pockets of the size illustrated in FIGS. 8, 9 and 10.

In carrying out the novel method, the paperboard panel will be unwound from the roll 13 and trained over the tension mechanism and through the edge control member. Similarly, the transparent plastic strips will be unwound from the respective rolls of plastic and trained over the respective tension mechanisms, through the respective edge control members and thereafter over the guide roller 33. The paperboard and plastic strips will then be trained over the guide roller 34, the roller 35 and through the indexing drive roller mechanism 55 and then through the overdrive roller unit 62. The apparatus will then be energized and the paperboard and plastic strips will be moved through the predetermined path of travel. The indexer device 36 is operable to interrupt travel of the paperboard panel and the strips so that that portion of the paperboard and strips located beneath the heat sealing mechanisms will be interrupted. The indexing device is operable to simultaneously operate the heat sealing mechanisms so that the transverse and longitudinal heat seals are simultaneously formed on the paperboard panel and plastic strips. When the drive to the paperboard and plastic strips is interrupted by the indexer device 36, the paperboard and strips located upstream of the heat sealing devices will become untensioned and a loop will form below the roller 35 by this untensioned condition of the paperboard and strips. However, the cam follow-up arm 47 will be pivoted by the interaction of the cam follow-up roller 49 in the cam track 46 to move the end of the arm supporting the roller 35 in a downward direction, as viewed in FIG. 2, to thereby tension the loop in the paperboard panel and plastic strips. The indexing device interrupts the travel of the paperboard and plastic strips momentarily, and after the heat sealing action the overdrive roller unit 62 impels the heat sealed paperboard panel and plastic strips forwardly and the cutting and punching device operates to cut and simultaneously punch so that the multi-pocketed album sheets are successively formed in a continuous fashion. The sheets fall into the bins B and are then moved to the next station where the sheets are assembled into albums.

Thus, it will be seen that I have provided a novel process and apparatus for making a multi-pocketed album page in a manner completely different from any heretofore known process and apparatus.

While the preferred embodiments of the present invention have been described, it should be understood that various changes, adaptions and modifications may be made therein without departing from the spirit of the invention and the scope of the appended claims.

What is claimed is:

1. Apparatus for making a multipocketed album page for photograph albums, comprising:
   means revolvably supporting a roll of paperboard, said paperboard having parallel longitudinal edges and being wound into a tight roll;
   means revolvably supporting a plurality of substantially identical strips of transparent flexible plastic, each strip of plastic having parallel longitudinal edges and having a width dimension substantially less than the width dimension of the paperboard;
   driven means gripping one end of the paperboard and one end of each strip of plastic to simultaneously unwind the paperboard strips of plastic and move the same through a predetermined path of travel;
   means guiding the strips of plastic in contacting relation with the surfaces of the paperboard during said travel, said guiding means causing a plurality of the strips to engage one surface of the paperboard in side-by-side spaced apart relation, and causing a plurality of said strips to engage the other surface of the paperboard in side-by-side spaced apart relation, one plastic strip which engages one surface of the paperboard being disposed in opposed registering relation with a plastic strip engaging the other surface of the paperboard;
   heat sealing means extending longitudinally of the plastic strips and paperboard being positioned on the opposite sides of and along the path of travel of the plastic strips and paperboard, said longitudinal heat sealing means engaging said strips and causing each said strip to be heat sealed to the paperboard along a heat seal extending longitudinally of the plastic strip and paperboard whereby a strip engaging one surface of the paperboard will be heat sealed to the latter along a heat seal zone disposed in registering relation with the heat seal zone of a strip engaging the other surface of the paperboard;
   transverse heat sealing means extending transversely of the paperboard and strips and being positioned on opposite sides of and along the path of travel of the plastic strips and paperboard, said transverse heat sealing means engaging said strips and causing each strip to be heat sealed to the paperboard along longitudinally spaced apart transversely extending heat seal zones whereby a strip engaging one surface of the paperboard will be heat sealed to the latter along a transverse heat seal zone disposed in registering relation with a transverse heat seal zone of the strip engaging the other surface of the paperboard;
   shiftable shearing means positioned on the path of travel of the strips and paperboard and located downstream of said transverse sealing means, said shearing means being operable to successively cut the paperboard and strips through each transverse heat sealing zone to consecutively form album pages each having a plurality of transparent pockets on each surface thereof, each pocket being defined by each strip heat sealed along three edges of the latter to the paperboard.

2. The apparatus as defined in claim 1 wherein said longitudinal heat sealing means located on one side of the paperboard and plastic strips are shiftable towards and away from the longitudinal heat sealing means located on the other side of the paperboard and plastic strips whereby a plurality of said strips may be simultaneously sealed to opposed surfaces of the paperboard along heat seals extending longitudinally of the plastic strips and paperboard.

3. The apparatus as defined in claim 1 wherein said transverse heat sealing means located on one side of the paperboard and plastic strips are shiftable towards and away from the transverse heat sealing means located on the other side of the paperboard and plastic strips whereby a plurality of said strips are simultaneously sealed to opposed surfaces of the paperboard along heat seals extending transversely of the paperboard and plastic strips.

4. The apparatus as defined in claim 1 wherein said longitudinally extending heat sealing means comprises an upper heat sealing mechanism positioned above the paperboard and plastic strips, and a lower heat sealing mechanism positioned below said paperboard and plastic strips, means for shifting said longitudinal heat sealing mechanisms into and out of engaging relation with the strips, and said upper and lower longitudinally extending heat sealing mechanisms, when shifted into engaging relation with said strips, simultaneously causing a plurality of said strips on opposite surfaces of said paperboard to be heat sealed to the latter along heat seals extending longitudinally of the plastic strips and paperboard, said transverse heat sealing means including an upper transverse heat sealing mechanism positioned above the paperboard and plastic strips, and a lower transverse heat sealing mechanism positioned below the paperboard and plastic strips, means for shifting said upper and lower transverse heat sealing mechanisms into and out of engaging relation with said strips, said transverse heat sealing mechanisms, when shifted into engaging relation with said strips, causing a plurality of said strips to be simultaneously heat sealed to opposite surfaces of the paperboard along longitudinally spaced apart transverse heat sealing zones.

5. A process for making a pocketed album page comprising:

moving an elongate panel of paperboard in a predetermined path of travel, said panel of paperboard having parallel longitudinal edges;

simultaneously moving a plurality of elongate strips of flexible, transparent plastic material in predetermined paths of travel, each of said strips having a width dimension substantially less than the width dimension of said panel and each strip having parallel longitudinal edges, certain of said strips, during movement thereof, being disposed in side-by-side spaced apart parallel relation and engaging one surface of the panel, other of said strips, during movement thereof, being disposed in side-by-side spaced apart parallel relation and engaging the other surface of the panel;

interrupting movement of the panel and strips during its travel, applying longitudinally extending heat sealing media to opposite surfaces of the panel along one longitudinal edge of each strip;

continuing movement of the panels and strips and thereafter interrupting movement, applying transversely extending heat sealing media to opposite sides of the panel and strips to heat seal each strip to the panel along sealed zones extending transversely at right angles to the direction of travel of the panel and strips; and continuing movement of the panel and strips and then cutting the panel in strips transversely thereof intermediate each transverse heat seal zone to consecutively form album pages each having a plurality of transparent pockets on each surface thereof, each pocket being defined by each strip heat sealed along three edges of the latter to the paperboard.

6. The process as defined in claim 5 wherein said longitudinal heat sealing media is simultaneously applied to opposite surfaces of the panel and strips.

7. The process as defined in claim 6 wherein said transverse heat sealing media is simultaneously applied to opposite surfaces of the panel and strips.

* * * * *